United States Patent [19]
Barrett, Jr.

[11] Patent Number: 4,818,249
[45] Date of Patent: Apr. 4, 1989

[54] TREATED WOOD PRODUCTS

[76] Inventor: Raybon Barrett, Jr., 11821 Bitten Hollow #18, Austin, Tex. 78758

[21] Appl. No.: 137,587

[22] Filed: Dec. 24, 1987

[51] Int. Cl.⁴ ............................................. C10L 5/36
[52] U.S. Cl. .......................................... 44/14; 44/535; 428/905
[58] Field of Search ................ 428/905, 17, 45, 35, 428/36; 44/14, 24, 535, 521, 522, 520, 531

[56] References Cited

U.S. PATENT DOCUMENTS

| | | | |
|---|---|---|---|
| 3,660,055 | 5/1972 | Haller | 44/535 |
| 4,120,666 | 10/1978 | Lange | 44/24 |
| 4,302,210 | 11/1981 | Duncan | 428/17 |
| 4,634,614 | 1/1987 | Holzner | 428/35 |
| 4,713,291 | 12/1987 | Sasaki et al. | 428/905 |
| 4,720,409 | 1/1988 | Spector | 428/45 |

Primary Examiner—Ellis P. Robinson
Assistant Examiner—Donald J. Loney
Attorney, Agent, or Firm—Jerry T. Kearns

[57] ABSTRACT

Treated wood products for use in fireplaces and wood stoves are impregnated with a variety of scents which are given off during combustion. In a first embodiment of the invention, a conventional man made fireplace log is provided with a central bore and surrounding circumferentially spaced holes. A treated core is inserted into the central bore and treated rods are inserted into the circumferentially spaced holes. During combustion, the treated core and treated rods gradually give off the desired scent. In a second embodiment, a man made fireplace log is constructed of particulate wood materials which have been treated with the desired scent. In a third embodiment, wood powder which has been treated with the desired scent is supplied in a shaker can for application to a fire. Examples of scents which may be supplied are pine, cedar, floral scents, cologne, musk, perfume, opium, and various fruity fragrances.

5 Claims, 4 Drawing Sheets

TREATED WOOD PRODUCTS

BACKGROUND OF THE INVENTION

1. Field of the Invention

The present invention relates to treated wood products, and more particularly pertains to several embodiments of scented wood products for use in fireplaces and wood stoves. A large number of fireplaces, fireplace stove inserts and wood stoves are in use throughout the world. A substantial segment of these devices are utilized in cities, primarily for aesthetic purposes. As many city dwellers are removed from a convenient and economical supply of wood for combustion in these devices, various long burning man made fireplace logs have achieved success in the market. To enhance the sensory pleasures achieved from fires utilizing these man made materials, it is proposed to provide a variety of scented wood products.

2. Description of the Prior Art

Various types of treated wood products are known in the prior art. A typical example of such a treated wood product is to be found in U.S. Pat. No. 2,273,039, which issued to M. Hudson on Feb. 17, 1942. This patent discloses a process for treating wood products by distilling the water from the wood by placing the wood in a closed chamber, supplying a vapor phase of an organic liquid such as coal tar or petroleum fractions and maintaining the vapor in a drying chamber at a temperature substantially equal to the boiling point of the liquid at the pressure in the drying chamber during the entire drying operation and continuously drawing off the distilled water vapor from the drying chamber. The process contemplates the use of a creosote fraction or a wood preserving impregnant. U.S. Pat. No. 2,280,560, which issued to H. Vautherin on Apr. 21, 1942, discloses a process for the protective treatment of wood products. The process consists of placing the wood products to be preserved in a closed heat insulated airtight space and simultaneously heating the wood products both with radiated heat and by direct contact with steam under pressures ranging from about three to seven kilograms per square centimeter until the temperature of the wood is within the range of about 115 to 160 degrees C. The steam in contact with the wood contains a mist of an oily antiseptic substance. The steam is shut off and radiated heat is continued until the transformed color of the wood becomes substantially uniform throughout, whereby the elasticity of the wood is increased and a dry non-oily surface is produced. U.S. Pat. No. 2,461,302, which issued to J. Truhlar et al on Feb. 8, 1949, discloses a method of flameproofing wood products. The process includes the steps of dipping the wood product in a solution of antimony chloride and an organic phosphite and subsequently steaming the impregnated wood product to convert the antimony chloride to antimony oxides. U.S. Pat. No. 3,464,782, which issued to J. Ricard et al on Sept. 2, 1969, discloses a wood preservation process. The process includes the steps of treating the wood product to be protected with gaseous ammonia in fumigant consisting of a halogenated hydrocarbon, with the fumigant being reactive with ammonia to form a compound having residual fungicidal activity in the wood product. The fumigant may also consist of sulfuryl halide. U.S. Pat. No. 3,481,686, which issued to L. Ivnas et al on Dec. 2, 1969, discloses a method for treating wood chips. The method consists of transporting the wood chips pneumatically while simultaneously treating them with a biocidal agent. The treating agent may consist of pentachlorophenol, salts thereof, or O-phenylphenol and salts thereof. U.S. Pat. No. 3,922,397, which issued to J. Baymiller on Nov. 25, 1975, discloses a method for bleaching furniture. The furniture to be bleached is placed on a conveyor which passes through an air lock structure into an ammonia chamber. Ammonia is delivered to the ammonia chamber and causes the bleaching of the furniture. The furniture component is removed from the ammonia chamber through an air lock structure. Hydrogen peroxide may also be used as a bleaching agent. U.S. Pat. No. 4,233,929, which issued to R. Hurst et al on Nov. 18, 1980, discloses an apparatus for the treatment of timber. A vessel has at least three chambers arranged in series for passage of the timber therethrough on conveyor belts. The chambers are provided with a mechanism for drawing a vacuum at each end. Spraying heads are disposed in an intermediate chamber for applying a preservative liquid to the timber. The vacuums are maintained during passage of the timber through the end chambers, by means of seals which are arranged to close and open automatically as the timber enters and leaves the respective vacuum chambers. U.S. Pat. No. 4,418,101, which issued to C. House et al on Nov. 29, 1983, discloses a method of making thermoplastic hardboard from acetylated mat. A wet-felted mat of wood fibers is acetylated by coating the mat with a quantity of acetic anhydride ranging from five to seventy percent by volume of the mat and heating the mat at a temperature of from 150 to 300 degrees F. while confining substantially all of the acetic anhydride within the mat for about twenty to one hundred and twenty minutes. The acetylated mat is pressed into hardboard which may be bent into a variety of loops, spirals, helices, and other curvilinear shapes to make articles of furniture, protective packing products and the like. U.S. Pat. No. 4,597,940, which issued to B. Hager on July 1, 1986, discloses a preservative treatment of wood. The preservative treatment consists of the steps of placing evaporable sublimable ammonium salts close to the wood so that the salts form an atmosphere around the wood in which the microorganisms cannot develop. The treatment is of special interest for moist wood during a storage until it has been dried and is not further attached by fungi.

While the above mentioned wood treated wood products are suited for their intended usage, none of these wood treatments provide for a scented wood product for use in home fireplaces and wood stoves. Inasmuch as the art is relatively crowded with respect to these various types of treated wood products, it can be appreciated that there is a continuing need for and interest in improvements to such treated wood products, and in this respect, the present invention addresses this need and interest.

SUMMARY OF THE INVENTION

In view of the foregoing disadvantages inherent in the known types of treated wood products now present in the prior art, the present invention provides an improved treated wood product. As such, the general purpose of the present invention, which will be described subsequently in greater detail, is to provide a new and improved treated wood product which has all the advantages of the prior art treated wood products and none of the disadvantages.

To attain this, representative embodiments of the concepts of the present invention are illustrated in the drawings and make use of man made wood sticks or powder which is treated with a scent. The present invention further contemplates the use of a man made fireplace log provided with a central bore for the reception of a scented core. The present invention may also utilize a series of circumferentially arranged holes for the reception of scented rods. The scented rods may be utilized in conjunction with a man made fireplace log, or utilized by themselves. A further feature of the present invention is the provision of a scented wood powder in a shaker can for application to a fire.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved treated wood products which have all the advantages of the prior art treated wood products and none of the disadvantages.

It is another object of the present invention to provide new and improved treated wood products which may be easily and efficiently manufactured and marketed.

It is a further object of the present invention to provide new and improved treated wood products which are of a durable and reliable construction.

An even further object of the present invention is to provide new and improved treated wood products which are susceptible of a low cost of manufacture with regard to both materials and labor, and which accordingly are then susceptible of low prices of sale to the consuming public, thereby making such treated wood products economically available to the buying public.

Still yet another object of the present invention is to provide new and improved treated wood products which provide in the apparatuses and methods of the prior art some of the advantages thereof, while simultaneously overcoming some of the disadvantages normally associated therewith.

Still another object of the present invention is to provide new and improved treated wood products which give off pleasing fragrances when burned in a fireplace or a wood stove.

Yet another object of the present invention is to provide new and improved treated wood products which may be utilized with a man made fireplace log, or may be separately utilized.

Even still another object of the present invention is to provide new and improved treated wood products which may be applied in a powdered form from a shaker can to a fire and which, when burned, give off pleasing fragrances.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
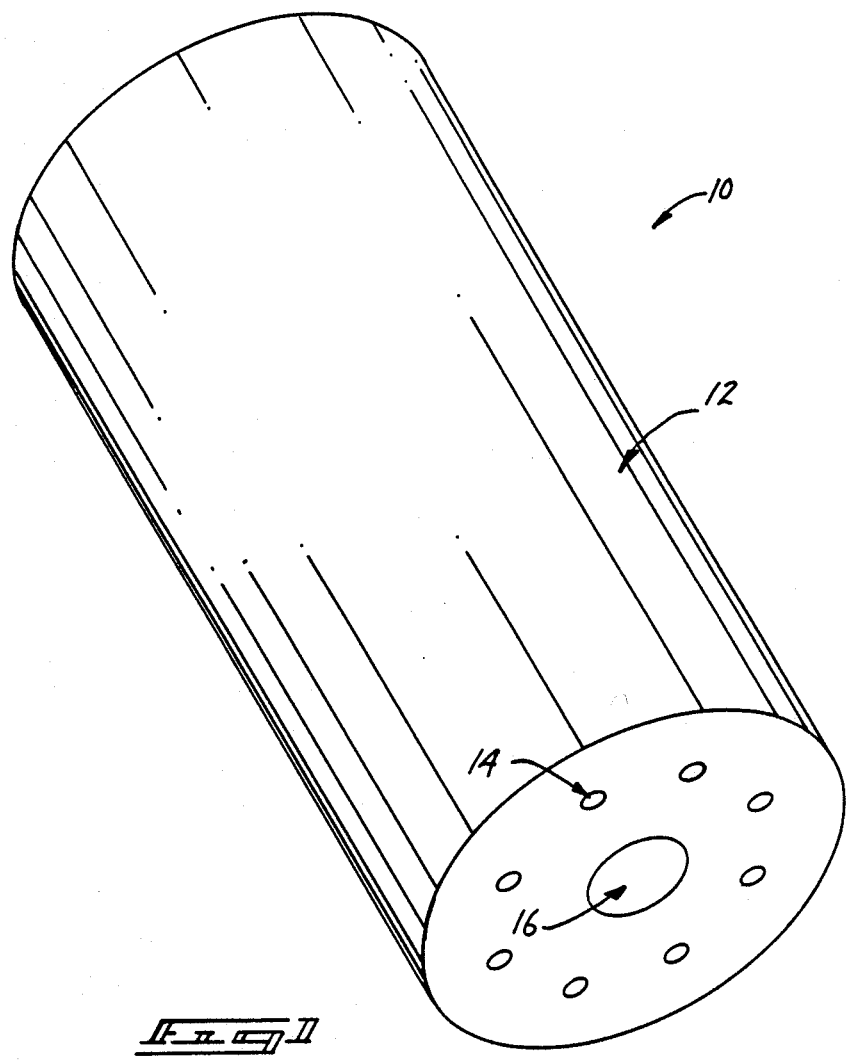
FIG. 1 is a perspective view of a man made fireplace log having a central bore and circumferentially spaced holes.

With reference now to the drawings, and in particular to FIG. 1 thereof, new and improved treated wood products embodying the principles and concepts of the present invention and generally designated by the reference numeral 10 will be described.

More specifically, it will be noted that the first embodiment 10 of the invention includes a man made fireplace log 12 constructed of conventional materials, but provided with a longitudinally extending central bore 16 and a plurality of circumferential longitudinally extending holes 14.

Figure 2:
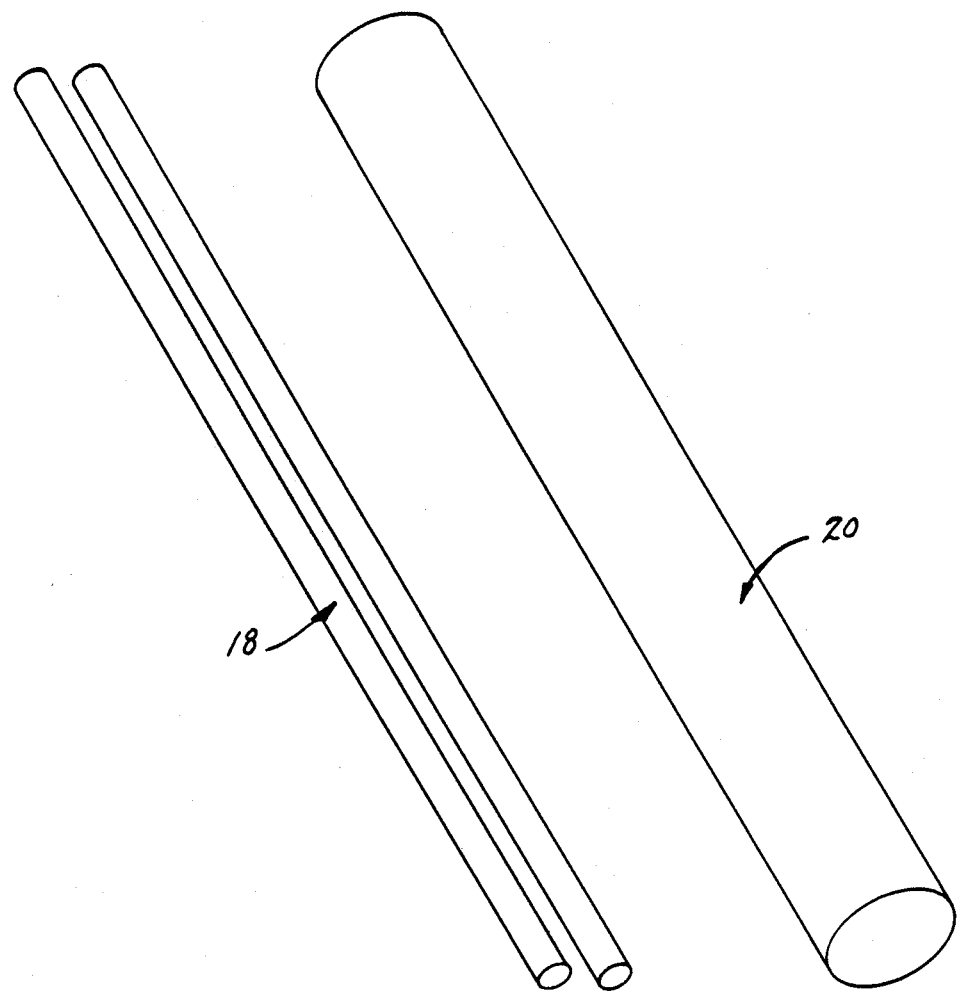
FIG. 2 is a perspective view of a central core for use with the man made fireplace log of FIG. 1, and a plurality of rods for insertion into the circumferentially spaced holes of the log of FIG. 1.

FIG. 2 is a perspective view of a plurality of rods 18 and a central core 20. The rods 18 and 20 are constructed from compressed, scented wood products. Rods 18 are dimensioned for insertion into holes 14 of the man made fireplace log of FIG. 1. Core 20 is dimensioned for insertion into the central core 16 of the man made fireplace log of FIG. 1. The scent treatment of rods 18 and core 20 may be selected from a variety of conventional compounds, for example, pine, cedar, cologne, musk, perfume, opium, and floral scents. The composition of these various scented compounds is conventional and forms no part of the present invention. A variety of conventional fragrant esters may be utilized.

Figure 3:
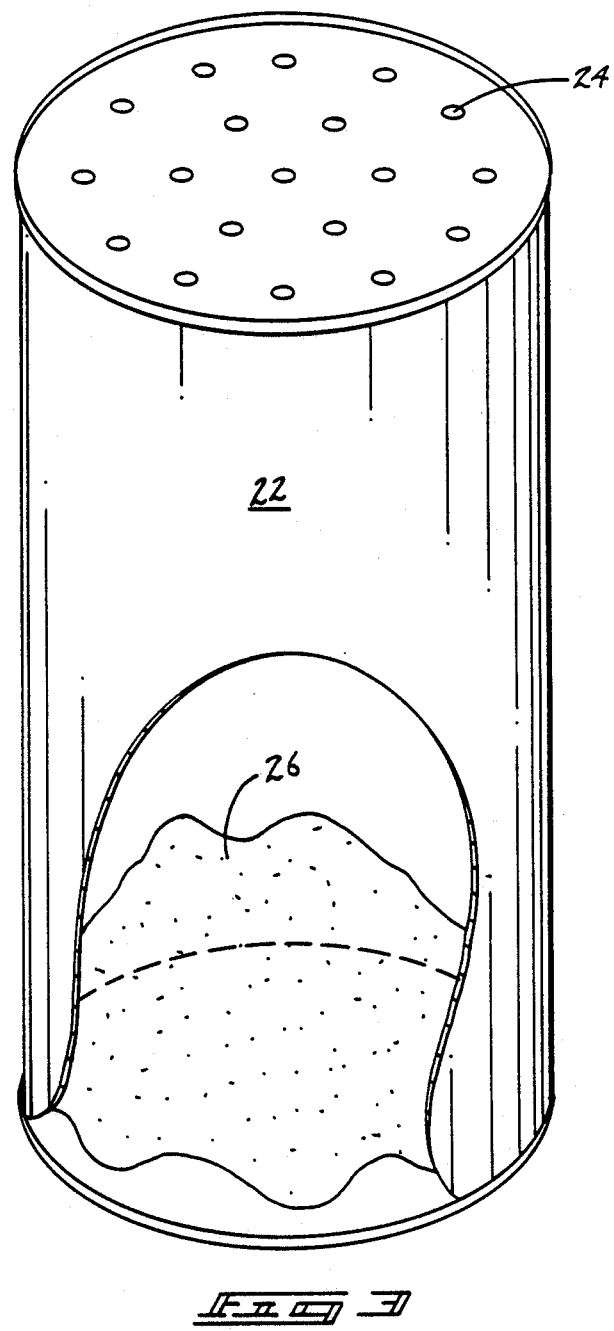
FIG. 3 is a perspective view, partially cut away illustrating a scented powdered wood product designed to be dispensed from a shaker can.

With reference now to FIG. 3, a shaker can 22 is provided with a plurality of holes 24 for dispensing a scented wood powder 26. This wood powder is treated with conventional compounds as described with respect to rods 18 and core 20.

Figure 4:
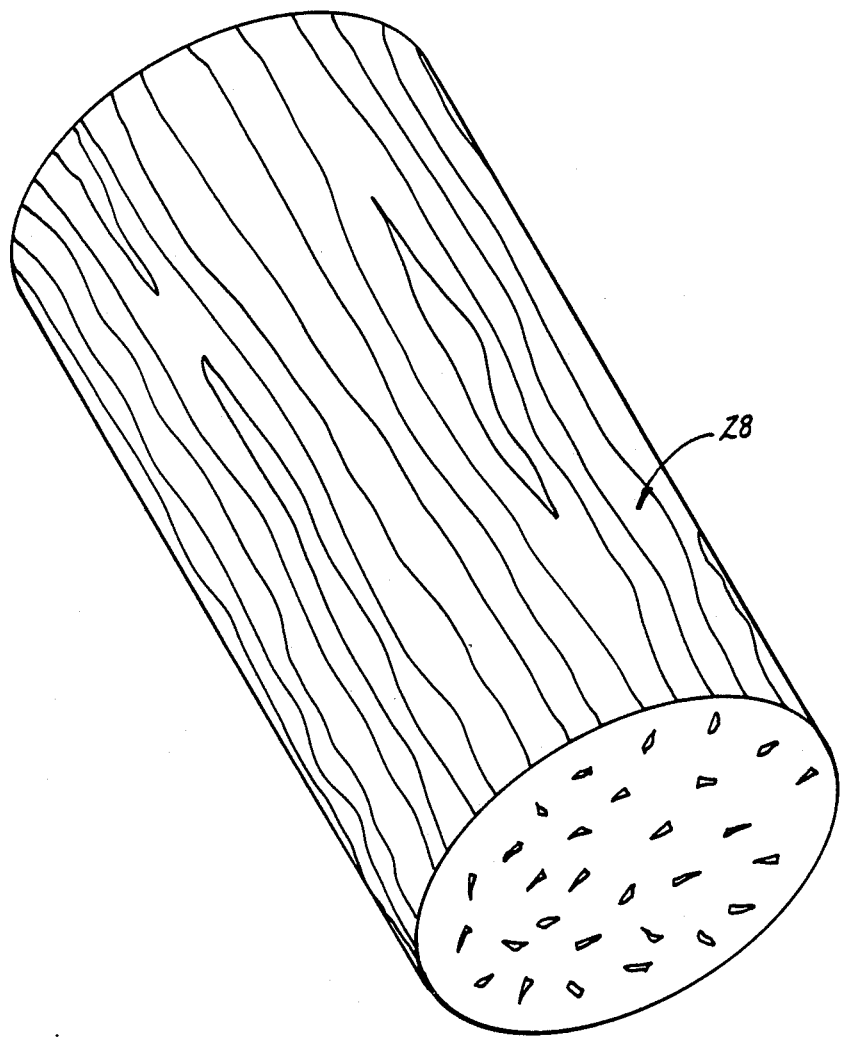
FIG. 4 is a perspective view of a man made fireplace log constructed from scented compressed wood products.

With reference now FIG. 4, a man made log constructed from compressed wood materials is illustrated. The wood materials are treated with the desired scent before being compressed into the log.

The usage of the treated wood products of the present invention will now be described. With reference now to FIGS. 1 and 2, treated scented rods 18 are inserted into circumferentially spaced holes 14 of the log 12 of FIG. 1. It is contemplated that the scented rods 18 will be sold in packages of a variety of scents. Thus, the log 20 is a standard item which may be provided with any desired scent by selection of the appropriate rods 18. Central core 20 is inserted into the central bore 16 of the man made log 12 of FIG. 1. Likewise, the central core 20 may be selected as desired from a variety of available scents. It is also contemplated that scented rods 18 and core 20 may be utilized individually without the log 20 in the starting of a fire, or to add scent to an existing fire.

The powdered scented wood product of FIG. 3 is utilized by shaking the powder from the can 22 through holes 24 onto an existing fire. In this manner, a brief period of fragrance production may be obtained. It is contemplated that a variety of assorted scents will be marketed in these shaker cans.

The usage of the man made fireplace log of FIG. 4 is identical to the usage of a conventional fireplace log. The log is already impregnated with the desired scent, and is merely inserted into an existing fire.

It is contemplated that in addition to the cylindrical shape of fireplace log illustrated, logs having a rectangular or square cross section may also be utilized without departing from the scope of the present invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved treated wood product for combustion in fireplaces and wood stoves, comprising:
   a man made fireplace log formed from compressed wood materials;
   a longitudinally extending central bore formed in said log;
   a cylindrical scented core received in said bore;
   a plurality of longitudinally extending holes arranged in a circle about said central bore;
   and
   a plurality of scented rods received in each of said holes.

2. The treated wood product of claim 1, wherein said scent is selected from the group consisting of pine, cedar, floral scents, cologne, musk, perfume, opium and fruity scents.

3. A new and improved treated wood product for combustion in fireplaces and wood stoves, comprising:
   a man made fireplace log formed from compressed wood materials;
   at least one longitudinally extending bore formed in said log;
   and
   a cylindrical scented core removably received in said bore.

4. The treated wood product of claim 3, wherein said man made fireplace log is provided with a plurality of longitudinally extending central bores;
   and
   a cylindrical scented core removably received in each of said bores.

5. The treated wood product of claim 3, wherein said scent is selected from the group consisting of pine, cedar, floral scents, cologne, musk, perfume, opium, and fruity scents.

* * * * *